US012056594B2

(12) United States Patent
Venkataramani et al.

(10) Patent No.: US 12,056,594 B2
(45) Date of Patent: Aug. 6, 2024

(54) LOW PRECISION DEEP NEURAL NETWORK ENABLED BY COMPENSATION INSTRUCTIONS

(71) Applicant: INTERNATIONAL BUSINESS MACHINES CORPORATION, Armonk, NY (US)

(72) Inventors: Swagath Venkataramani, Yonkers, NY (US); Shubham Jain, Yorktown Heights, NY (US); Vijayalakshmi Srinivasan, New York, NY (US); Jungwook Choi, Elmsford, NY (US); Leland Chang, New York, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 1157 days.

(21) Appl. No.: 16/020,952

(22) Filed: Jun. 27, 2018

(65) Prior Publication Data

US 2020/0005125 A1    Jan. 2, 2020

(51) Int. Cl.
*G06N 3/063* (2023.01)
*G06F 1/3296* (2019.01)
(Continued)

(52) U.S. Cl.
CPC ........... *G06N 3/063* (2013.01); *G06F 1/3296* (2013.01); *G06F 17/16* (2013.01); *G06N 3/048* (2023.01)

(58) Field of Classification Search
CPC .... G06N 3/063; G06N 3/0481; G06F 1/3296; G06F 17/16
(Continued)

(56) References Cited

U.S. PATENT DOCUMENTS 8,463,063 B2    6/2013  Tsukamoto
2002/0032713 A1  3/2002  Jou
(Continued)

FOREIGN PATENT DOCUMENTS

CN    101729762 A    6/2010
CN    102520906 A    6/2012
(Continued)

OTHER PUBLICATIONS

Wang, et al., "Small-footprint high-performance deep neural network-based speech recognition using split-VQ", 2015 IEEE International Conference on Acoustics, Speech and Signal Processing (ICASSP), Aug. 6, 2015 (Year: 2015).*
(Continued)

*Primary Examiner* — Markus A. Vasquez
(74) *Attorney, Agent, or Firm* — Intelletek Law Group, PLLC; Gabriel Daniel, Esq.

(57) ABSTRACT

A compensated deep neural network (compensated-DNN) is provided. A first vector having a set of components and a second vector having a set of corresponding components are received. A component of the first vector includes a first quantized value and a first compensation instruction, and a corresponding component of the second vector includes a second quantized value and a second compensation instruction. The first quantized value is multiplied with the second quantized value to compute a raw product value. The raw product value is compensated for a quantization error according to the first and second compensation instructions to produce a compensated product value. The compensated product value is added into an accumulated value for the dot product. The accumulated value is converted into an output vector of the dot product. The output vector includes an output quantized value and an output compensation instruction.

20 Claims, 5 Drawing Sheets

(51) Int. Cl.
*G06F 17/16* (2006.01)
*G06N 3/048* (2023.01)

(58) Field of Classification Search
USPC .......................................................... 706/15
See application file for complete search history.

(56) References Cited

U.S. PATENT DOCUMENTS

| | | | | |
|---|---|---|---|---|
| 2014/0355769 | A1* | 12/2014 | Peters | G10L 19/167 381/23 |
| 2015/0332681 | A1* | 11/2015 | Kim | H04S 3/02 381/17 |
| 2017/0323197 | A1* | 11/2017 | Gibson | G06N 3/0454 |
| 2018/0129937 | A1 | 5/2018 | Bradbury et al. | |
| 2018/0198661 | A1* | 7/2018 | Palmers | H04B 1/123 |

FOREIGN PATENT DOCUMENTS

| | | |
|---|---|---|
| CN | 106203622 A | 12/2016 |
| CN | 107862378 A | 3/2018 |
| JP | 2018-73017 A | 5/2018 |
| WO | 2016/182671 A1 | 11/2016 |

OTHER PUBLICATIONS

International Search Report and Written Opinion from related application PCT/IB2019/054960 dated Sep. 29, 2019; 10 pgs.
Binas, J. "Brain-Inspired Models and Systems for Distributed Computation" Doctoral Thesis (2017); 114 pgs.
Courbariaux, M. et al., "BinaryConnect: Training Deep Neural Networks with Binary Weights During Propagations"; https://github.com/MatthieuCourbariaux/BinaryConnect 9 pgs.
Dong, Y. et al., "Learning Accurate Low-Bit Deep Neural Networks with Stochastic Quantization"; https://github.com/dongyp13/Stochastic-Quantization (2017); 12 pgs.
Mellempudi, N. et al., "Mixed Low-Precision Deep Learning Inference Using Dynamic Fixed Point"; arXiv:1701.08978v2 [cs.LG] Feb. 1, 2017; 6 pgs.
Miyashita, D. et al., "Convolutional Networks Using Logarithmic Data Representation"; arXiv: 1603.01025v2 [cs.NE] Mar. 17, 2016; 10 pgs.
Shin, "Session 14 Overview: Deep-Learning Processors"; IEEE International Solid-State Circuits Conference (2017); 23 pgs.
Matthieu, C. et al. "Training deep neural networks with low precision multiplications." arXiv preprint arXiv:1412.7024 (2015), 10 pgs.
Lin, D. et al. "Overcoming Challenges in Fixed Point Training of Deep Convolutional Networks", arXiv preprint arXiv:1607.02241 (2016), 6 pgs.
Lia, L. et al. "Deep Convolutional Neural Network Inference with Floating-point Weights and Fixed-point Activations", arXiv preprint arXiv:1703.03073 (2017), 10 pgs.
Courbariaux, M. et al. "Low precision storage for deep learning", arXiv preprint arXiv:1412.7024 (2015), 9 pgs.
Gysel, P. et al., "Hardware-oriented approximation of convolutional neural networks," arXiv preprint arXiv:1604.03168 (2016), 8 pgs.
Judd, P. et al. "Proteus: Exploiting numerical precision variability in deep neural networks", Proceedings of the 2016 International Conference on Supercomputing (2016), 6 pgs.
Judd, P. et al. "Reduced-Precision Strategies for Bounded Memory in Deep Neural Nets", arXiv: 1511.05236 v4 [cs.LG]. arXiv. org, (2016), 12 pgs.
Gupta, S. et al. "Deep learning with limited numerical precision", Proceedings of the 32nd International Conference on Machine Learning (ICML-15) (2015), 10 pgs.
Venkataramani, S. et al. "AxNN: energy-efficient neuromorphic systems using approximate computing", Proceedings of the 2014 international symposium on Low power electronics and design (ACM—2014), 6 pgs.
Deng, Z. et al. "Reduced-Precision Memory Value Approximation for Deep Learning", Hewlett Packard Enterprise Development LP (2015), 9 pgs.

* cited by examiner

LOW PRECISION DEEP NEURAL NETWORK ENABLED BY COMPENSATION INSTRUCTIONS

BACKGROUND

Technical Field

The present disclosure generally relates to computation by neural networks.

Description of the Related Art

The field of Artificial Intelligence (AI) has witnessed a quintessential growth in recent years with the advent of Deep Neural Networks (DNNs) that have achieved state-of-the-art classification accuracies on many recognition tasks involving images, videos, text and natural language. DNNs are multi-layered networks of basic compute units called artificial neurons. Each layer in the network is associated with a set of weights. Each neuron in a layer evaluates a multi-input, single-output function that computes dot-product of its inputs and weights, followed by a non-linear activation function on the weighted sum. DNNs operate in two phases: (i) Training and (ii) Inference. Training is performed based on a labeled dataset, where the weights of the DNN are iteratively refined using the Stochastic Gradient Descent (SGD) algorithm. During inference, inputs hitherto unseen are classified using the trained model.

SUMMARY

Some embodiments of the disclosure provide a processing element for an artificial neuron of a deep neural network (DNN). The processing element is configured to produce a dot product based on a first vector having a set of components and a second vector having a set of corresponding components. A component of the first vector includes a first quantized value and a first compensation instruction and a corresponding component of the second vector includes a second quantized value and a second compensation instruction. The processing element includes a computation module configured to multiply the first quantized value with the second quantized value to compute a raw product value. The processing element includes a compensation module configured to compensate the raw product value for a quantization error according to the first and second compensation instructions to produce a compensated product value. The processing element includes an accumulation module configured to add the compensated product value into an accumulated value for the dot product. The processing element includes a conversion module configured to convert the accumulated value into an output vector of the dot-product, the output vector including an output quantized value and an output compensation instruction.

A compensation instruction includes a direction bit and a magnitude bit for compensating a quantization error of the quantized value. In some embodiments, a compensation instruction includes no more than four bits that include a direction bit, a zero compensation bit, and two or less magnitude bits. The zero compensation bits indicates whether the quantization error is less than a threshold, such that the estimated quantization error is zero and the quantized value need not be compensated. In some embodiments, the compensation module is in a low power mode when the zero compensation bits of both the first quantization instruction and the second quantization instruction indicate that the estimated quantization errors for both the first and second quantized values are zero.

The preceding Summary is intended to serve as a brief introduction to some embodiments of the disclosure. It is not meant to be an introduction or overview of all inventive subject matter disclosed in this document. The Detailed Description that follows and the Drawings that are referred to in the Detailed Description will further describe the embodiments described in the Summary as well as other embodiments. Accordingly, to understand all the embodiments described by this document, a Summary, Detailed Description and the Drawings are provided. Moreover, the claimed subject matter is not to be limited by the illustrative details in the Summary, Detailed Description, and the Drawings, but rather is to be defined by the appended claims, because the claimed subject matter can be embodied in other specific forms without departing from the spirit of the subject matter.

BRIEF DESCRIPTION OF THE DRAWINGS

The drawings are of illustrative embodiments. They do not illustrate all embodiments. Other embodiments may be used in addition or instead. Details that may be apparent or unnecessary may be omitted to save space or for more effective illustration. Some embodiments may be practiced with additional components or steps and/or without all of the components or steps that are illustrated. When the same numeral appears in different drawings, it refers to the same or like components or steps.

DETAILED DESCRIPTION

Figure 1:
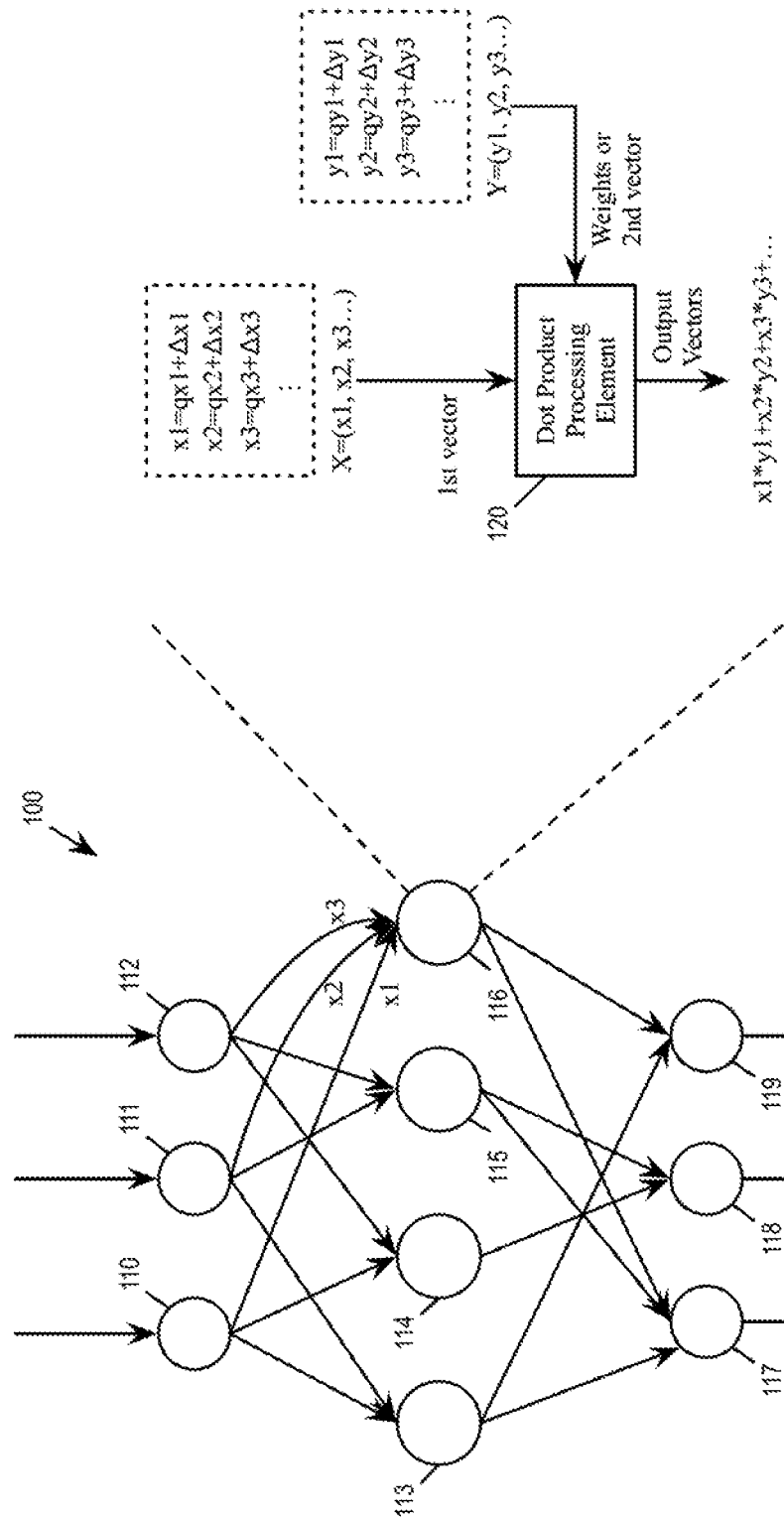
FIG. 1 illustrates a compensated-DNN in which the MAC operations are based on numerical values represented in Fixed Point with Error Compensation (FPEC) format to facilitate dynamic compensation of quantization errors, consistent with an exemplary embodiment.

In the following detailed description, numerous specific details are set forth by way of examples in order to provide a thorough understanding of the relevant teachings. However, it should be apparent that the present teachings may be practiced without such details. In other instances, well-known methods, procedures, components, and/or circuitry have been described at a relatively high-level, without detail, in order to avoid unnecessarily obscuring aspects of the present teachings.

Deep Neural Networks (DNN) are the state-of-the-art solutions in many recognition problems involving images, video, text, and natural language. However, the computational and storage demands imposed by these large-scale networks have been the primary bottleneck to their ubiquitous adoption, as the amount of data processed by DNNs impose significant computational challenges. A key scenario that exemplifies this extreme computational challenge is low-power inference, where DNN models are executed on deeply-embedded wearable and Internet of Things (IoT) devices that have stringent energy and area constraints. One approach to improve the efficiency of DNNs, specifically in the context of low-power platforms (such as mobile, wearables, and other IoT devices), is to explore low-precision implementations using low-precision fixed point (<16 bits) representation. However, low-precision implementations suffer from quantization errors that are inherent in any fixed-point implementation. The choice of bit-widths is therefore limited if the system is to maintain application-level accuracy. Increasing the network size and/or re-training the DNN has been proposed to minimize loss of accuracy due to quantization, albeit with limited success.

Some embodiments of the disclosure provide compensated-DNN, in which errors introduced by quantization are dynamically compensated during execution. Numbers in compensated-DNN are represented in Fixed Point with Error Compensation (FPEC) format. The bits in FPEC are split between computation bits and compensation bits. The computation bits use conventional floating-point notation (FxP) to represent the number at low-precision. The compensation bits explicitly capture an estimate (direction and magnitude) of the quantization error in the representation. For a given word length, FPEC may use fewer computation bits compared to FxP representation. This enables a near-quadratic improvement in energy in the multiply-and-accumulate (MAC) operations in the DNN. In some embodiments, a low-overhead sparse compensation scheme based on the compensation bits is used to estimate the error accrued during MAC operations, which is then added to the MAC output to minimize the impact of quantization.

It is observed that MAC operations intrinsically exhibit the property of error compensation. Specifically, when MAC operations accumulate multiplication results, the quantization errors of the multiplication operations are also being accrued. If the quantization errors of different multiplication operations take opposite signs, the quantization errors partially cancel each other out, reducing the quantization error in the eventual dot-product output. In practice, the quantization errors of the multiplication operations may be positive or negative. Whether the quantization error is positive or negative is determined based on several factors, including the rounding mode of the inputs, the sign of the inputs, among others. Regardless, the DNN dynamically estimates the accrued quantization error and explicitly offsets the error, thereby minimizing degradation in classification accuracy.

FIG. 1 illustrates a compensated-DNN 100 in which the MAC operations are based on numerical values represented in FPEC format to facilitate dynamic compensation of quantization errors, consistent with an exemplary embodiment. As illustrated, the DNN 100 includes artificial neurons 110-119. The artificial neurons 110-119 are organized into multiple interconnected layers. Each neuron receives a set of inputs and performs dot-product based on its received inputs to produce a single output. The inputs to an artificial neuron may include outputs from other artificial neurons and/or primary inputs of the network. Each neuron may be implemented as a module of software instructions or a module of electrical circuits. The inputs to the artificial neurons may be implemented as data structures in a computer memory or electrical wires in an electronic device.

Each artificial neuron 110-119 computes a dot-product between a first vector and a second vector. The components of the first vector may be a set of values received from the artificial neuron's interconnections. The components of the second vector may be a set of corresponding weights for the components of the first vector. As illustrated, the artificial neuron 116 receives inputs x1, x2, and x3 from outputs of neurons 110, 111, and 112. The artificial neuron 116 applies weights y1, y2, and y3 to the inputs x1, x2, and x3, respectively. The artificial neuron 116 includes a dot-product processing element 120 that is configured to compute a weighted sum of the first vector (corresponds to X vector in the figure) with components [x1, x2, x3] using weights in the second vector (corresponds to Y vector in the figure) with components [y1, y2, y3]. An example dot-product processing element 120 will be described by reference to FIG. 4 below.

The components of the X vector and the Y vector are in FPEC format. The bit-fields in FPEC are split into 2 groups: computation bits and compensation bits. For a value x (e.g., component x1 in the X vector or component y2 in the Y vector) that is represented in FPEC format, the computation bits provide the quantized value qx. The compensation bits specify an estimate of quantization error Δx, or an estimated error Δx(est).

Figure 2:
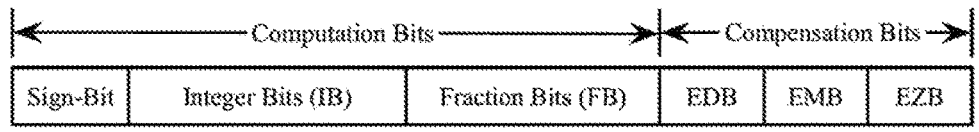
FIG. 2 illustrates the FPEC format for representing floating-point numbers, consistent with an exemplary embodiment.

FIG. 2 illustrates the FPEC format for representing floating-point numbers, consistent with an exemplary embodiment. As illustrated, the bit-fields in FPEC are split into computation bits and compensation bits. The computation bits include a sign bit (Sign), integer bits (IB), and fractional bits (FB) to capture the range and resolution of numbers. The compensation bits specify the direction and magnitude of the error incurred during quantization. The compensation bits are sub-divided into 3 fields: (i) Error Direction Bit (EDB), (ii) Error Magnitude Bit (EMB) and (iii) Error Zero Bit (EZB). EDB indicates whether the number is rounded up or down, i.e., the direction of the quantization error. EMB denotes the magnitude of the quantization error. The compensation bits of a FPEC number are used to compute an estimated quantization error or a compensation value for compensating the quantized value in the computation bits. The compensation bits of a FPEC are therefore also a compensation instruction.

If the EDB and EMB fields contain δ and θ respectively, then the estimated error is $-1^{\delta}*2^{-FB-1-\theta}$. In some embodiments, the error estimates are constrained to powers of 2 to avoid multipliers in the compensation logic. In some embodiments, the EMB field is optional in a FPEC representation. For example, if only the direction of error is specified, θ is assumed to be 0 and the magnitude of the error is half of the resolution i.e., and the estimated error is $\pm 2^{-FB-1}$.

The EZB field is a single bit that indicates zero quantization error. EZB enables FPEC to limit compensation to only selected computations. When EZB is 1, EDB and EMB fields are don't cares (e.g., EDB and EMB are not processed by the processing element 120).

Figure 3:
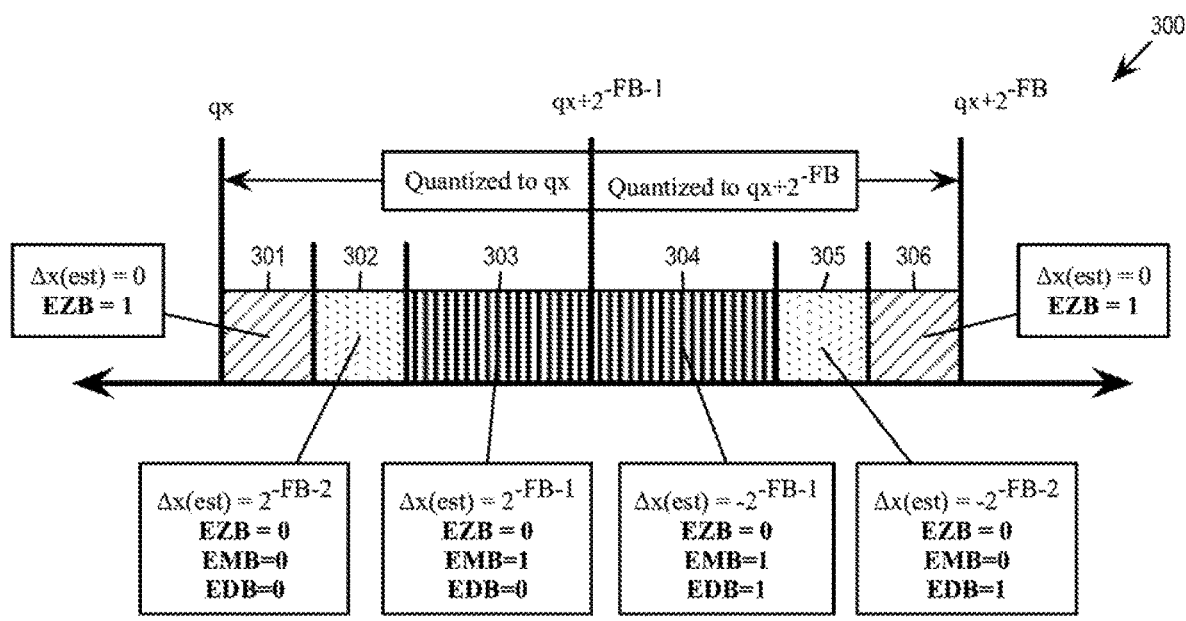
FIG. 3 illustrates the mapping between quantization errors and compensation bits of FPEC, consistent with an exemplary embodiment.

FIG. 3 illustrates the mapping between quantization errors and compensation bits of FPEC, consistent with an exemplary embodiment. For a value x represented in FPEC, the figure shows a continuous range 300 between qx and $qx+2^{-FB}$, which are two successive quantized values. The range is divided into a number of regions 301-306, whose estimated quantization errors are represented in FPEC. Quantization causes values above $qx+2^{-FB-1}$ to be rounded up to $qx+2^{-FB}$ and values below $qx+2^{-FB-1}$ to be rounded down to qx. The EDB indicating the direction of the rounding.

For actual values of x in regions 301 and 306 (close to qx or qx+$2^{FB}$), the quantization error is sufficiently small. The EZB is therefore set to 1 and the estimated error Δx(est) is 0. The size of the region 301 and 306 for setting EZB to 1 is controlled by a threshold that can be modulated to control the degree of sparsity in compensation.

For values in regions 302-305 where EZB=0, the EMB field (optionally) splits the range in powers of 2. The values with larger quantization errors have EMB set to 1 (regions 303 and 304) and the estimated error Δx(est) encoded in the compensation bits is $2^{-FB-1}$. The values with small quantization errors have EMB set to 0 (regions 302 and 305) and the estimated error Δx(est) encoded in the compensation bits is $2^{-FB-2}$.

Table 1 below illustrates example values that are represented by FPEC format in which the bit-widths of EDB, EMB, and EZB are all 1. For each actual value represented by FPEC, the table shows its corresponding quantized value, quantization error, FPEC estimated error, and FPEC representation. Note that a 'd' represents a "don't care" bit. The bit-width of IB is 3 and the bit-width of FB is 0.

TABLE 1

Example values represented by FPEC format

| x (actual value) | qx (quantized value) | Δx (quantization error) | Δx(est) (estimated error by FPEC) | FPEC representation [SB, IB, FB] [EDB, EMB, EZB] |
| --- | --- | --- | --- | --- |
| 2.4 | 2 | 0.4 | 0.5 | 0 010 010 |
| 2.1 | 2 | 0.1 | 0 | 0 010 dd1 |
| 2.8 | 3 | −0.2 | −0.25 | 0 011 100 |
| 3.05 | 3 | 0.05 | 0 | 0 011 dd1 |

As mentioned, each artificial neuron computes the dot product of its inputs and weights. The X vector [$x_1$, $x_2$, $x_3$, ...] represents inputs and a Y vector [$y_1$, $y_2$, $y_3$, ...] represents the weights. The X vector and the Y vector are quantized to QX=[$qx_1$, $qx_2$, $qx_3$, ...] and QY=[$qy_1$, $qy_2$, $qy_3$, ...], with quantization errors ΔX=[$\Delta x_1$, $\Delta x_2$, $\Delta x_3$, ...] and ΔY=[$\Delta y_1$, $\Delta y_2$, $\Delta y_3$, ...]. In other words, X=QX+ΔX where $x_i$=$qx_i$+$\Delta x_i$, and Y=QY+ΔY where $y_i$=$qy_i$+$\Delta y_i$. The dot product is therefore $$X \cdot Y = QX \cdot QY + \Delta Y \cdot QX + \Delta X \cdot QY + \Delta X \cdot \Delta Y \quad \text{Eq. (1)}$$

The quantization error for the dot product is therefore $$\Delta(X \cdot Y) = \Delta Y \cdot QX + \Delta X \cdot QY + \Delta X \cdot \Delta Y \quad \text{Eq. (2)}$$

The computation bits of the components of the X and Y vectors provide values for quantized values QX and QY. The compensation bits of the components of X and Y provide estimates for quantization errors ΔX and ΔY, or estimated errors ΔX(est) and ΔY(est). The estimated quantization errors ΔX(est) and ΔY(est) can then be used to compute the estimated quantization error for the dot product:

$$\Delta(X \cdot Y)(est) = \Delta Y(est) \cdot QX + \Delta X(est) \cdot QY + \Delta X(est) \cdot \Delta Y(est) \quad \text{Eq. (3)}$$

In some embodiments, approximations are used during the computation of the estimated quantization error of the dot product. First, since the magnitude of quantization error is typically smaller than the actual value (i.e., QX,QY>>ΔX, ΔY), the higher order term ΔX(est)·ΔY(est) is ignored. Second, input quantization errors are approximated to the nearest power of 2, thereby converting multipliers to shifters when computing ΔY(est)·QX and ΔX(est)·QY. Third, at most 1 or 2 bits are used to capture the magnitude of quantization errors (so only 1 or 2 EMB bits and 3 or 4 compensation bits in total), which makes the shifters less expensive. Fourth, ΔX(est) and ΔY(est) are made sparse by ignoring smaller quantization errors in the input. Therefore, compensation is performed only for certain selected computations, and the compensation logic is active for only a fraction of the overall execution cycles. These approximations significantly reduce the energy expended for estimating the quantization error.

Figure 4:
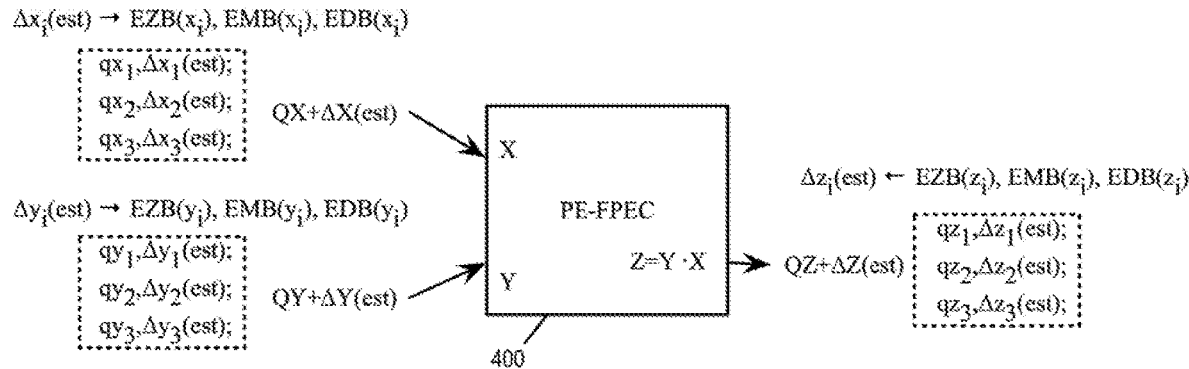
FIG. 4 illustrates an example design of a processing element of an artificial neuron.
Figure 4:
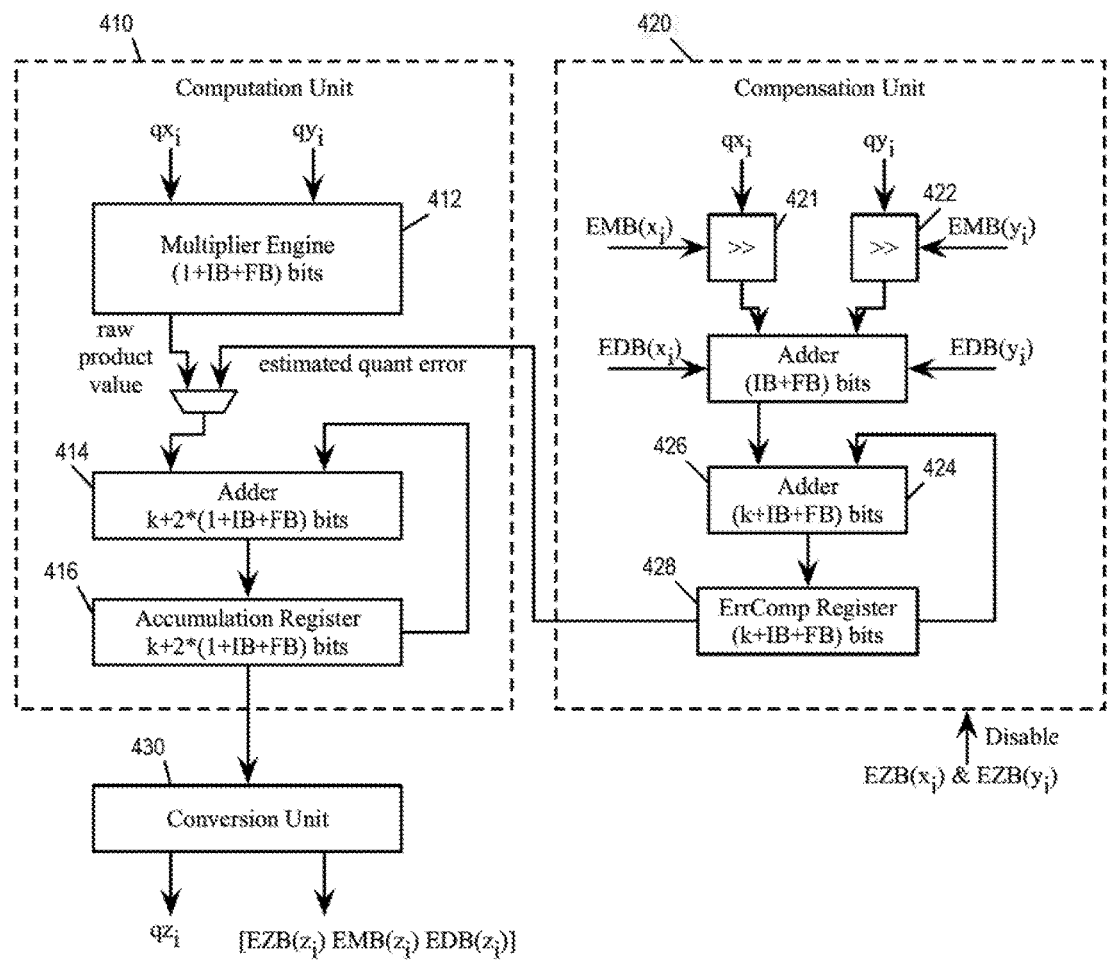

FIG. 4 illustrates an example design of a processing element 400 of an artificial neuron. The processing element (PE) performs dot product computation between an X vector and a Y vector. The processing element accepts values in FPEC format. The processing element 400 is therefore also referred to as an FPEC-PE. The FPEC-PE performs compensation of quantization errors by computing estimated errors based on the FPEC compensation bits. Approximations are used during the computation of the estimated errors.

As illustrated, the FPEC-PE 400 includes (i) a Computation unit 410, (ii) a Compensation unit 420, and (iii) a Conversion unit 430. In some embodiments, the Computation unit 410, the Compensation unit 420, and the Conversion unit 430 are modules of software instructions being executed by one or more processing units (e.g., a processor) of a computing device. In some embodiments, the Computation unit 410, the Compensation unit 420, and the Conversion unit 430 are modules of hardware circuits implemented by one or more integrated circuits (ICs) of an electronic apparatus. An example computing device that may implement the FPEC-PE will be described by reference to FIG. 6 below.

The computation unit 410 includes a multiply-and-accumulate engine 412 that evaluates the dot-product using the values in [IB,FB] fields (computation bits) of FPEC. Specifically, the multiply-and-accumulate engine 412 multiplies a component from the X vector with a corresponding component from the Y vector to produce a raw product value to be added by an adder 414 to an accumulator register 416.

The compensation unit 420 simultaneously evaluates the quantization error at the dot-product output using the [EDB, EMB,EZB] fields (compensation bits). This involves shifting the X vector component using EMB bits of $x_i$ (at shifter 421) and the Y vector component using EMB bits of $y_i$ (at shifter 422) and appropriately adding/subtracting (at adder 424) them from the compensation sum (at adder 426 and ErrComp register 428) based on the respective EDB bits. The EZB bits of $x_i$ and $y_i$ combine (logic AND) to render the compensation unit 420 inactive or in low power mode (by e.g., clock gating, signal gating, etc.). After all inputs are processed, the compensation sum (i.e., estimated error for the dot product Δ(X·Y)(est)) is added to the accumulator register 412 in the computation unit 410 to produce a compensated dot-product output.

The conversion unit 430 quantizes the output to its desired FPEC format. The conversion unit 430 includes a shifter to scale the output based on [IB,FB]. The conversion unit 430 includes a bit-wise logic to infer output compensation bits [EDB,EMB,EZB] based on the scaled bits. The output can be used as a vector to another processing element that uses the quantized values in the output to compute a raw product value and compensates the computed raw product according to the compensation bits in the output.

It is worth noting that the PE-FPEC 400 is energy efficient because FPEC representation allows quantization error to be expressed by fewer computation bits. This yields a near-quadratic improvement in the computation unit 410, as the multiplier, adder, and accumulator bit-widths are correspondingly reduced. On the other hand, the adders and registers in the compensation unit 420 do incur a linear increase in logic. However, they are used sporadically, such as when the EZBs of $x_i$ and $y_i$ are asserted (once every 3 to 5 computations in experiments). The overhead in the conversion unit 430 is negligible, as it is active only once per dot-product, which takes thousands of computation cycles in large-scale DNNs.

By representing values in the FPEC format, an artificial neuron is able to perform dot product operations with minimal quantization errors by using fewer computation bits and very few compensation bits. An architecture based on FPEC such as the processing element 400 can rely on approximations to compute estimated quantization errors with reduced energy expenditure and computation resources. This improves DNNs in terms of size and power, which is critical for lower power applications.

Figure 5:
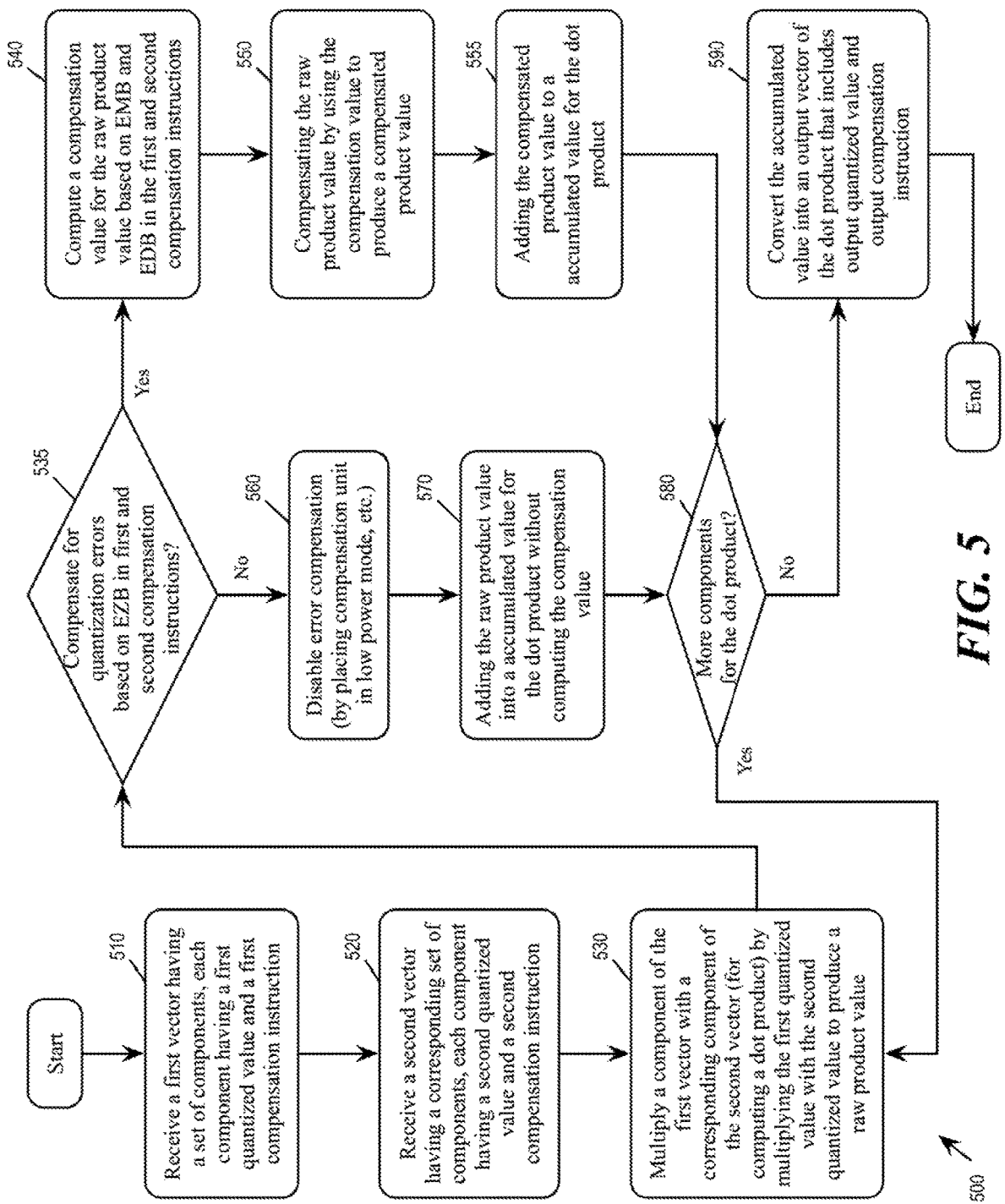
FIG. 5 conceptually illustrates a process for computing a dot product between two vectors at an artificial neuron of a DNN, consistent with an exemplary embodiment.

FIG. 5 conceptually illustrates a process 500 for computing a dot product between two vectors at an artificial neuron of a DNN, consistent with an exemplary embodiment. In some embodiments, a processing element (e.g., PE-FPEC 400) of an artificial neuron performs the process 500. In some embodiments, one or more processing units (e.g., processor) of a computing device implementing the DNN 100 perform the process 500 by executing instructions stored in a computer readable medium.

The process 500 starts when the processing element receives (at 510) a first vector having a set of components (e.g., X vector). Each component of the first vector having a first quantized value (e.g., qx) and a first compensation instruction (e.g., estimated quantization error $\Delta X(est)$). The process element also receives (at 520) a second vector having a corresponding set of components (e.g., Y vector). Each component of the second vector has a second quantized value (e.g., qy) and a second compensation instruction (e.g., estimated quantization error $\Delta Y(est)$).

For some embodiments, the components of the first vector correspond to input connections to the artificial neuron, while the components of the second vector correspond to weights that are to be applied to the input connections. For a vector component that is in FPEC format, its quantized value is represented by the computation bits [IB,FB] and its compensation instruction includes the compensation bits [EDB, EMB, EZB]. The compensation bits also represent an estimated quantization error for the vector component.

The processing element multiplies (at 530) a component of the first vector with a corresponding component of the second vector by multiplying the first quantized value with the second quantized value to produce a raw product value as part of the dot product computation.

The processing element determines (at 535) whether to compensate for quantization errors based on EZB of the first and second compensation instructions. If the EZB of both the first and second compensation instructions are asserted (indicating both $\Delta X(est)$ and $\Delta Y(est)$ are zero), the process proceeds to 560 as there is no need to perform compensation. Otherwise the process proceeds to 540 to perform quantization error compensation.

At 540, the processing element computes a compensation value (or estimated quantization error) for the raw product value based on EMB and EDB in the first and second compensation instructions. The process unit compensates (at 550) the raw product value by using the computed compensation value to produce a compensated product value. The processing element then adds (at 555) the compensated product value to an accumulated value for the dot product. The process then proceeds to 580.

At 560, the processing element disables the error compensation operation by placing the compensation unit in low power mode, disabling the compensation unit, etc., since the estimated error of both X component and Y component are zeros. The processing element adds (at 570) the raw product value to the accumulated value for the dot product without computing the compensation value. The process then proceeds to 580.

At 580, the processing element determines whether there are more components in the first and second vectors that have yet to be multiplied and accumulated for the dot product. If so, the process returns to 530 to process the next pair of components from the first and second vectors. If all of the components have been multiplied and accumulated for the dot product, the process proceeds to 590.

At 590, the processing element converts the accumulated value into an output vector of the dot product that includes an output quantized value and an output compensation instruction (with EZB, EDB, and EMB). This operation corresponds to the conversion unit 430. The process 500 then ends.

The present application may be a system, a method, and/or a computer program product at any possible technical detail level of integration. The computer program product may include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions. These computer readable program instructions may be provided to a processor of a computer or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks. The flowchart and block diagrams in the Figures (e.g., FIG. 5) illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 6:
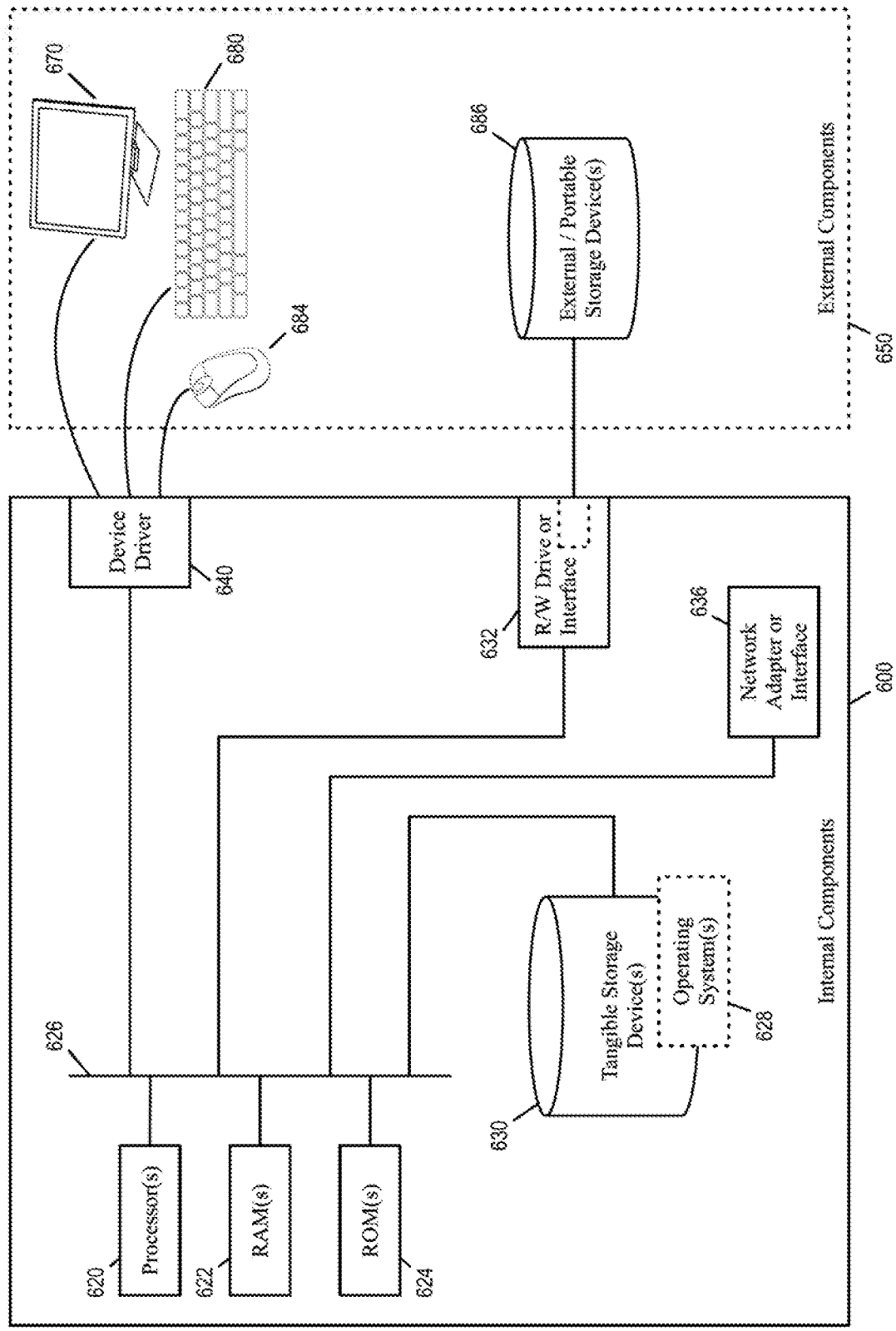
FIG. 6 shows a block diagram of the components of a data processing system in accordance with an illustrative embodiment of the present disclosure.

FIG. 6 shows a block diagram of the components of data processing systems 600 and 650 that may be used to implement a DNN, an artificial neuron, or a FPEC processing element in accordance with an illustrative embodiment of the present disclosure. It should be appreciated that FIG. 6 provides only an illustration of one implementation and does not imply any limitations with regard to the environments in which different embodiments may be implemented. Many modifications to the depicted environments may be made based on design and implementation requirements.

Data processing systems 600 and 650 are representative of any electronic device capable of executing machine-readable program instructions. Data processing systems 600 and 650 may be representative of a smart phone, a computer system, PDA, or other electronic devices. Examples of computing systems, environments, and/or configurations that may represented by data processing systems 600 and 650 include, but are not limited to, personal computer systems, server computer systems, thin clients, thick clients, hand-held or laptop devices, multiprocessor systems, microprocessor-based systems, network PCs, minicomputer systems, and distributed cloud computing environments that include any of the above systems or devices.

The data processing systems 600 and 650 may include a set of internal components 600 and a set of external components 650 illustrated in FIG. 6. The set of internal components 600 includes one or more processors 620, one or more computer-readable RAMs 622 and one or more computer-readable ROMs 624 on one or more buses 626, and one or more operating systems 628 and one or more computer-readable tangible storage devices 630. The one or more operating systems 628 and programs such as the programs for executing the process 500 are stored on one or more computer-readable tangible storage devices 630 for execution by one or more processors 620 via one or more RAMs 622 (which typically include cache memory). In the embodiment illustrated in FIG. 6, each of the computer-readable tangible storage devices 630 is a magnetic disk storage device of an internal hard drive. Alternatively, each of the computer-readable tangible storage devices 630 is a semiconductor storage device such as ROM 624, EPROM, flash memory or any other computer-readable tangible storage device that can store a computer program and digital information.

The set of internal components 600 also includes a R/W drive or interface 632 to read from and write to one or more portable computer-readable tangible storage devices 686 such as a CD-ROM, DVD, memory stick, magnetic tape, magnetic disk, optical disk or semiconductor storage device. The instructions for executing the processes 500 can be stored on one or more of the respective portable computer-readable tangible storage devices 686, read via the respective R/W drive or interface 632 and loaded into the respective hard drive 630.

The set of internal components 600 may also include network adapters (or switch port cards) or interfaces 636 such as a TCP/IP adapter cards, wireless Wi-Fi interface cards, or 3G or 4G wireless interface cards or other wired or wireless communication links. Instructions of processes or programs described above can be downloaded from an external computer (e.g., server) via a network (for example, the Internet, a local area network or other, wide area network) and respective network adapters or interfaces 636. From the network adapters (or switch port adaptors) or interfaces 636, the instructions and data of the described programs or processes are loaded into the respective hard drive 630. The network may comprise copper wires, optical fibers, wireless transmission, routers, firewalls, switches, gateway computers and/or edge servers.

The set of external components 650 can include a computer display monitor 670, a keyboard 680, and a computer mouse 684. The set of external components 650 can also include touch screens, virtual keyboards, touch pads, pointing devices, and other human interface devices. The set of internal components 600 also includes device drivers 640 to interface to computer display monitor 670, keyboard 680 and computer mouse 684. The device drivers 640, R/W drive or interface 632 and network adapter or interface 636 comprise hardware and software (stored in storage device 630 and/or ROM 624).

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computing device comprising:
a hardware processor; and
a storage device storing a set of instructions, wherein an execution of the set of instructions by the processor configures the computing device to perform, by one or more neurons of a compensated Deep Neural Network (DNN), acts comprising:
receiving a first vector having a set of components and a second vector having a set of corresponding components, wherein a component of the first vector comprises a first quantized value and a first compensation instruction, and a corresponding component of the second vector comprises a second quantized value and a second compensation instruction;
multiplying the first quantized value with the second quantized value to compute a raw product value;
determining, based on the first and second compensation instructions, not to compensate for quantization errors;
in response to determining not to compensate for quantization errors:
placing into a low power mode a compensation circuit configured to compensate the raw product value for a quantization error according to the first and second compensation instructions to produce a compensated product value and to add the compensated product value into an accumulated value for the dot product;
adding the raw product value into the accumulated value for the dot product without computing the compensated product value; and
converting the accumulated value into an output vector of the dot product, the output vector comprising an output quantized value and an output compensation instruction.

2. The computing device of claim 1, wherein the output compensation instruction comprises a bit to indicate whether the output quantized value is to be compensated by an estimated quantization error.

3. The computing device of claim 1, wherein:
the first compensation instruction comprises a first direction bit and a first magnitude bit for compensating a quantization error of the first quantized value; and
the second compensation instruction comprises a second direction bit and a second magnitude bit for compensating a quantization error of the second quantized value.

4. The computing device of claim 3, wherein compensating the raw product value for a quantization error according to the first and second compensation instructions to produce a compensated product value, comprises:
shifting the first quantization value according to the first magnitude bit;
shifting the second quantization value according to the second magnitude bit;
adding the shifted first quantization value and the shifted second quantization value to produce a compensation value according to the first and second direction bits; and
adding the compensation value with the raw product value to produce the compensated product value.

5. The computing device of claim 1, wherein execution of the set of instructions by the processor further configures the computing device to perform acts, comprising:
placing a compensation circuit in a low power mode upon determining that the first compensation instruction includes a bit that indicates that a quantization error of the first quantized value is less than a threshold and the second compensation instruction includes a bit that indicates that a quantization error of the second quantized value is less than a threshold.

6. The computing device of claim 1, wherein the first compensation instruction comprises no more than four bits, comprising a direction bit, a zero compensation bit, and two or less magnitude bits.

7. An integrated circuit (IC) comprising:
a processing element circuit comprising one or more neurons of a compensated Deep Neural Network (DNN) configured to produce a dot product based on a first vector having a set of components and a second vector having a set of corresponding components, wherein a component of the first vector comprises a first quantized value and a first compensation instruction and a corresponding component of the second vector comprises a second quantized value and a second compensation instruction, the processing element circuit comprising:
a computation circuit configured to:
multiply the first quantized value with the second quantized value to compute a raw product value;
adding the raw product value into the accumulated value for the dot product without computing the compensated product value; and determine, based on the first and second compensation instructions, not to compensate for quantization errors;
a compensation circuit configured to compensate the raw product value for a quantization error according to the first and second compensation instructions to produce a compensated product value; and
an accumulation circuit configured to add the compensated product value into an accumulated value for the dot product, wherein the computation circuit is further configured to in response to determining not to compensate for quantization errors, placing the compensation circuit into a low power mode.

8. The IC of claim 7, wherein the processing element further comprises a conversion circuit configured to convert the accumulated value into an output vector of the dot-product, the output vector comprising an output quantized value and an output compensation instruction.

9. The IC of claim 8, wherein the processing element is a first processing element, wherein the output vector is used as a vector to a second processing element that is configured to use the output quantized value to compute a second raw product value and compensate the second raw product according to the output compensation instruction.

10. The IC of claim 8, wherein the output compensation instruction comprises a bit to indicate whether an estimated quantization error for the output quantized value is zero.

11. The IC of claim 7, wherein:
the first compensation instruction comprises a first direction bit and a first magnitude bit for compensating a quantization error of the first quantized value; and
the second compensation instruction comprises a second direction bit and a second magnitude bit for compensating a quantization error of the second quantized value.

12. The IC of claim 11, wherein compensating the raw product value for a quantization error according to the first and second compensation instructions to produce a compensated product value comprises:
shifting the first quantization value according to the first magnitude bit;
shifting the second quantization value according to the second magnitude bit;
adding the shifted first quantization value and the shifted second quantization value to produce a compensation value according to the first and second direction bits; and
adding the compensation value with the raw product value to produce the compensated product value.

13. The IC of claim 7, wherein the compensation circuit is in a low power mode upon determining that the first compensation instruction includes a bit that indicates that an estimated quantization error of the first quantized value is zero and the second compensation instruction includes a bit that indicates that an estimated quantization error of the second quantized value is zero.

14. The IC of claim 7, wherein the first compensation instruction comprises no more than four bits, comprising a direction bit, a zero compensation bit, and two or less magnitude bits.

15. A computer-implemented method for computing a dot-product by one or more neurons of a compensated Deep Neural Network (DNN), comprising:
receiving a first vector having a set of components and a second vector having a set of corresponding components, wherein a component of the first vector comprises a first quantized value and a first compensation instruction and a corresponding component of the second vector comprises a second quantized value and a second compensation instruction;
multiplying the first quantized value with the second quantized value to compute a raw product value;
determining, based on the first and second compensation instructions, not to compensate for quantization errors;
in response to determining not to compensate for quantization errors:
placing into a low power mode a compensation circuit configured to compensate the raw product value for a quantization error according to the first and second compensation instructions to produce a compensated product value and to add the compensated product value into an accumulated value for the dot product;
adding the raw product value into the accumulated value for the dot product without computing the compensated product value; and
converting the accumulated value into an output vector of the dot product, the output vector comprising an output quantized value and an output compensation instruction.

16. The computer-implemented method of claim 15, wherein the dot-product is a first dot-product, the method further comprising using the output vector as a vector to compute a second raw product value for a second dot-product and to compensate the second raw product according to the output compensation instruction.

17. The computer-implemented method of claim 15, wherein:
the first compensation instruction comprises a first direction bit and a first magnitude bit for compensating a quantization error of the first quantized value; and
the second compensation instruction comprises a second direction bit and a second magnitude bit for compensating a quantization error of the second quantized value.

18. The computer-implemented method of claim 17, wherein compensating the raw product value for a quantization error according to the first and second compensation instructions to produce a compensated product value comprises:
shifting the first quantization value according to the first magnitude bit;
shifting the second quantization value according to the second magnitude bit;
adding the shifted first quantization value and the shifted second quantization value to produce a compensation value according to the first and second direction bits; and
adding the compensation value with the raw product value to produce the compensated product value.

19. The computer-implemented method of claim 15, further comprising:
placing a compensation circuit in a low power mode upon determining that the first compensation instruction includes a bit that indicates that a quantization error of the first quantized value is less than a threshold and the second compensation instruction includes a bit that indicates that a quantization error of the second quantized value is less than a threshold.

20. The computer-implemented method of claim 15, wherein the first compensation instruction comprises no more than four bits, comprising a direction bit, a zero compensation bit, and two or less magnitude bits.

* * * * *